United States Patent
Solomon et al.

(10) Patent No.: US 8,806,919 B2
(45) Date of Patent: Aug. 19, 2014

(54) LEAK DETECTION APPARATUS AND METHOD

(75) Inventors: George M. Solomon, Oak Ridge, TN (US); Mark D. Boeckmann, Oak Ridge, TN (US)

(73) Assignee: Vacuum Technology Inc., Oak Ridge, TN (US)

( * ) Notice: Subject to any disclaimer, the term of this patent is extended or adjusted under 35 U.S.C. 154(b) by 389 days.

(21) Appl. No.: 13/136,332

(22) Filed: Jul. 29, 2011

(65) Prior Publication Data

US 2013/0025349 A1 Jan. 31, 2013

(51) Int. Cl.
*G01M 3/20* (2006.01)
*G01M 3/22* (2006.01)

(52) U.S. Cl.
CPC ....................................... *G01M 3/22* (2013.01)
USPC ........................................................ 73/40.7

(58) Field of Classification Search
CPC .......... G01M 3/20; G01M 3/22; G01M 3/222
USPC ........................................................ 73/40.7
See application file for complete search history.

(56) References Cited

U.S. PATENT DOCUMENTS

| | | | | |
|---|---|---|---|---|
| 4,123,932 A * | 11/1978 | Baker et al. | ................... | 73/28.01 |
| 5,168,747 A * | 12/1992 | Weaver et al. | ................. | 73/40.7 |
| 6,742,384 B2 * | 6/2004 | Avila | ............................ | 73/40.7 |
| 7,189,066 B2 * | 3/2007 | Liepert | ............................ | 418/5 |
| 7,448,256 B2 | 11/2008 | Jenneus et al. | | |
| 7,905,132 B1 | 3/2011 | Chamberlain | | |
| 2008/0307858 A1 * | 12/2008 | McManus et al. | ............. | 73/40.7 |
| 2009/0145200 A1 * | 6/2009 | Kumar et al. | ................... | 73/40.7 |
| 2009/0277249 A1 * | 11/2009 | Polster et al. | ................... | 73/40.7 |

* cited by examiner

*Primary Examiner* — Daniel S Larkin
(74) *Attorney, Agent, or Firm* — Robert J. Lauf

(57) ABSTRACT

A leak detector contains a pump that withdraws gas from a volume into which a tracer gas is leaking. The volume may also contain small amounts of air or other gas in addition to the tracer gas. Downstream from the pump, a flow restriction creates a back pressure between this restriction and the outlet of the pump, the back pressure being determined by the pressure in the test volume, the pumping speed, and the nature of the flow restriction. The flow restriction may be fixed, such as an orifice or a section of a capillary tube, or it may be variable, such as a needle valve. In many cases, the back pressure may be adjusted to approximately one atmosphere, allowing the use there of various conventional gas sensors that are designed to operate at one atmosphere. The invention may also be used for general gas analysis problems.

16 Claims, 6 Drawing Sheets

LEAK DETECTION APPARATUS AND METHOD

BACKGROUND OF THE INVENTION

1. Field of the Invention

The invention pertains to apparatus and methods for detecting leaks in gas-tight components. More particularly, the invention pertains to apparatus and methods for detecting leaks using tracer gases to measure leakage into or out of a pressurized or evacuated component.

2. Description of Related Art

In the field of gas-handling equipment, for example, refrigeration components, such as heat exchangers and the like, there is typically the requirement that every system is tested before shipment to ensure that no refrigerant leakage is occurring. The 100% test requirement often represents the critical path or bottleneck in production of items such as refrigerators and air conditioners. Testing may be done in any of several ways, which will be described in further detail:

A partially finished component (e.g., a heat exchanger) may be pressurized with refrigerant (e.g., R410A) or tracer gas (e.g., helium) and placed into a chamber that is held at a partial vacuum. A gas sampling system extracts gas from the chamber and analyzes this gas for traces of the refrigerant or tracer gas, using various conventional detection means, such as IR absorption, mass spectroscopy, etc. There are several engineering tradeoffs that exist in designing and using such systems. First, the size of the chamber largely determines how fast the system can be evacuated to the desired test pressure, and the lower the desired test pressure, the longer the pump down cycle; alternatively, a larger vacuum pump can be used but this adds cost to the system. Second, if one uses a somewhat higher pressure in the chamber, there is more gas competing with the tracer gas and therefore it takes longer for leaking tracer gas to diffuse from the point of the leak to the detector; for this reason, such systems occasionally employ mixers or fans within the test chamber to enhance the outward diffusion of the leaking tracer gas.

Alternatively, atmospheric detectors or "sniffers" are available to test a pressurized component without using a chamber. In this situation, the operator holds a wand and manually "sniffs" each braze joint, connection, or other potential source of leaks. This is very time-consuming, if done properly, but is most often used for checking an entire finished system such as a complete refrigerator that has relatively few possible leak points (assuming the heat exchanger has already been leak tested separately before assembly) and is too big to be practically tested in a vacuum chamber.

Traditional atmospheric accumulation is employed to test a pressurized component with the use of an enclosure at atmospheric conditions. This method is used to test the entire system. When the necessary dwell time has elapsed in order to allow the tracer gas concentration to increase, with or without mechanical assistance, the air and tracer gas mix is sampled with a detector. The cycle time is constrained by detection limits, pressure, and volume considerations. The transport of the tracer gas molecules to the detector is limited by diffusion through the other gas molecules at atmospheric pressure. In addition, the gas molecules at atmospheric pressure dilute the tracer gas molecules. The dwell time necessary to accumulate sufficient tracer gas for reliable go/no go test may be unacceptable in a production line setting.

OBJECTS AND ADVANTAGES

Objects of the present invention include the following: providing an apparatus for detecting leaks or performing gas analysis with improved speed and sensitivity; providing an apparatus for detecting leaks or performing gas analysis that needs no supplementary mixing device; providing an apparatus for detecting leaks or performing gas analysis that combines a pressure differential across the leak point with the use of atmospheric or other tracer gas detectors; providing an apparatus for detecting leaks or performing gas analysis in which a flow restriction creates a limited volume at typically, but not limited to, atmospheric pressure to facilitate detection of gases; providing an apparatus for detecting leaks or performing gas analysis that is adaptable to any selected tracer gas; providing an apparatus for detecting leaks or performing gas analysis that can be easily adapted to measuring leaks into or out of a gas-handling component; providing a method for detecting leaks or performing gas analysis with improved speed and sensitivity; providing a method for detecting leaks or performing gas analysis that is adaptable to any selected tracer gas; and, providing a method for detecting leaks or performing gas analysis that can be easily adapted to measuring leaks into or out of a gas-handling component. These and other objects and advantages of the invention will become apparent from consideration of the following specification, read in conjunction with the drawings.

SUMMARY OF THE INVENTION

According to one aspect of the invention, an apparatus for detecting gas leaks comprises: a component to be tested, the component containing a tracer gas at a first pressure; a chamber for containing the component, the chamber maintained at a second pressure less than the first pressure; a flow path comprising: a gas inlet from the chamber to a pump, a gas outlet from the pump, a flow restriction sufficient to create a third pressure greater than the second pressure in a selected volume of the flow path downstream from the pump, and, a sensor positioned within the selected volume to detect the tracer gas.

According to another aspect of the invention, an apparatus for detecting gas leaks comprises: a component to be tested, the component containing an internal volume; a chamber for containing the component, the chamber containing a selected tracer gas at a first pressure; a flow path comprising: a gas inlet from the internal volume of the component to a pump, the pump sufficient to establish a second pressure in the internal volume, the second pressure less than said first pressure, a gas outlet from the pump, a flow restriction sufficient to create a third pressure greater than the second pressure in a selected volume of the flow path downstream from the pump, and, a sensor positioned within the selected volume to detect the tracer gas.

According to another aspect of the invention, a method for detecting leaks comprises:
a) configuring a test volume into which a tracer gas may leak;
b) pumping gas from the test volume using a pump;
c) placing a flow restriction on the outlet side of the pump sufficient to establish a pressure in a selected downstream volume greater than the pressure in the test volume; and,
d) placing a gas sensor to detect the tracer gas within the selected downstream volume.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

The invention, in its most general form, contains a pump configured to withdraw gas from a volume into which a tracer gas is leaking. The volume will also typically contain small amounts of air or other gas in addition to the tracer gas. Downstream from the pump, a flow restriction creates a back pressure between this restriction and the outlet of the pump, the back pressure being determined by the pressure in the test volume, the pumping speed, and the nature of the flow restriction. As will be described more fully in the various examples, the flow restriction may be fixed, such as an orifice or a section of a capillary tube, or it may be variable, such as a needle valve. In many cases, it will be preferred that the back pressure is approximately one atmosphere, because this allows the placement there of various conventional gas sensors that are designed to work best at one atmosphere. The pump may be of any suitable type, including scroll pumps; rotary vane pumps; rotary piston pumps; screw pumps; diaphragm pumps; rotary lobe pumps; centrifugal pumps; turbomolecular pumps; drag pumps; diffusion pumps; and claw pumps.

Example

Figure 1:
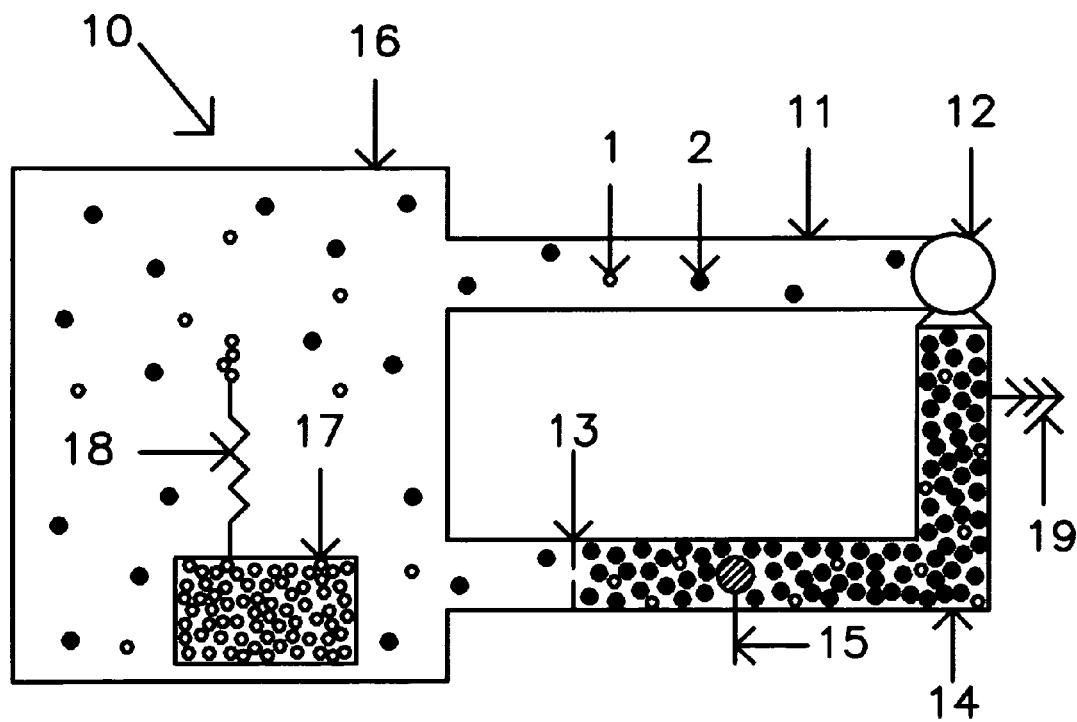
FIG. 1 is a schematic diagram of an example of the present invention configured in a recirculating mode to measure gas leaking out of a component.

Illustrated generally at 10 in FIG. 1 is an example of the invention configured to detect leakage in an "inside out" mode, in which a component 17 is placed within a chamber 16. The component 17 is pressurized with a tracer gas, which escapes from the component via any leaks 18. Gas containing molecules of tracer gas 1 along with any residual air or other matrix gas 2 is withdrawn from chamber 16 through line 11 by a pump 12. On the outlet side of pump 12 there is a restriction 13, shown in FIG. 1 as an orifice that creates a back pressure in line 14. A gas sensor 15 that is sensitive to molecules of tracer gas 1 is placed within line 14. An optional relief valve 19 prevents inadvertent overpressurization of line 14, which might occur, for example, if a leak developed in line 11. Gas leaving the restriction 13 is recirculated to chamber 16. This recirculation provides a further benefit in mixing the gas in chamber 16 so that any tracer gas molecules diffuse more quickly away from leak 18 and into the detection loop.

In the system shown in FIG. 1, component 17 is undergoing a static pressure test, in which it has been pressurized with the tracer gas and sealed before being placed into the chamber. It will be appreciated that the invention can also be configured to pressurize the component in a dynamic mode, in which gas lines (not shown) would be provided into and out of the component, via gas-tight feed-throughs in the wall of chamber 16.

The flow restriction 13 may be a fixed leak, such as an orifice, a porous plug, or a capillary tube. It will be appreciated that it may be desirable to change the size of the restriction from time to time, for example, if many different types of components are to be routinely tested. In that situation, it is contemplated that the user will have a set of orifice plates, each of which is calibrated for use with a particular test component.

Example

Figure 2:
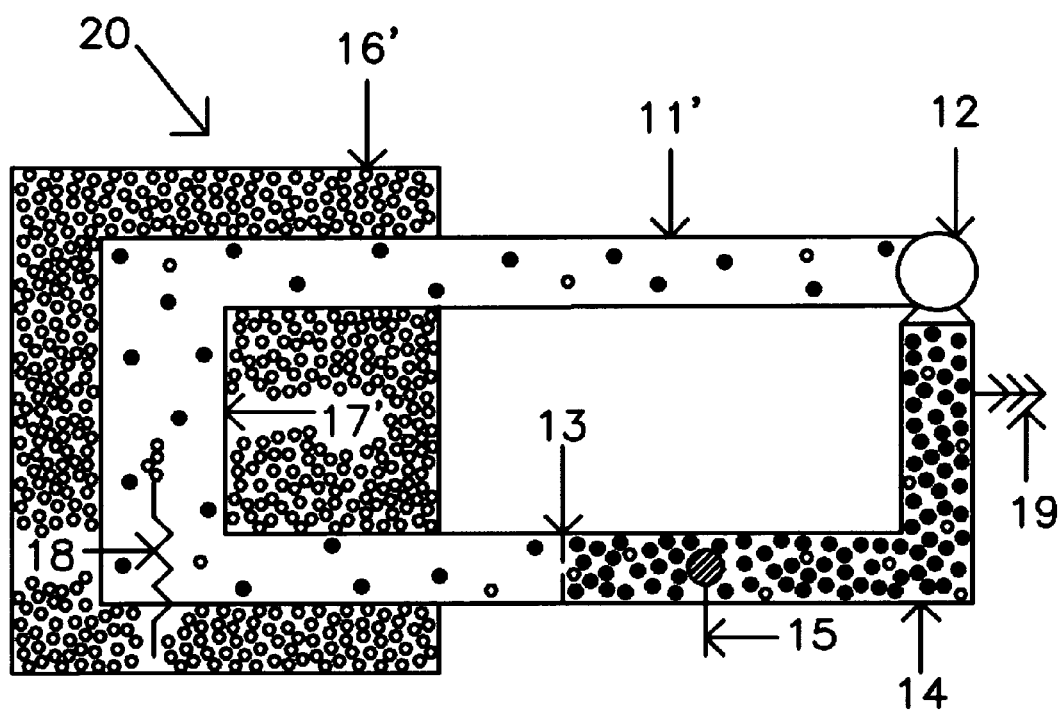
FIG. 2 is a schematic diagram of an example of the present invention configured in a recirculating mode to measure gas leaking into a component.

Illustrated generally at 20 in FIG. 2 is an example of the invention configured to detect leakage in an "outside in" mode, in which a component 17' is placed within chamber 16'. The chamber 16' is pressurized with a tracer gas, which seeps into the component via any leaks 18. Gas is withdrawn from the interior volume of component 17' through line 11' by pump 12, and the rest of the process operates as in the previous example. Gas is recirculated to component 17' after it exits flow restriction 13.

Example

Figure 3:
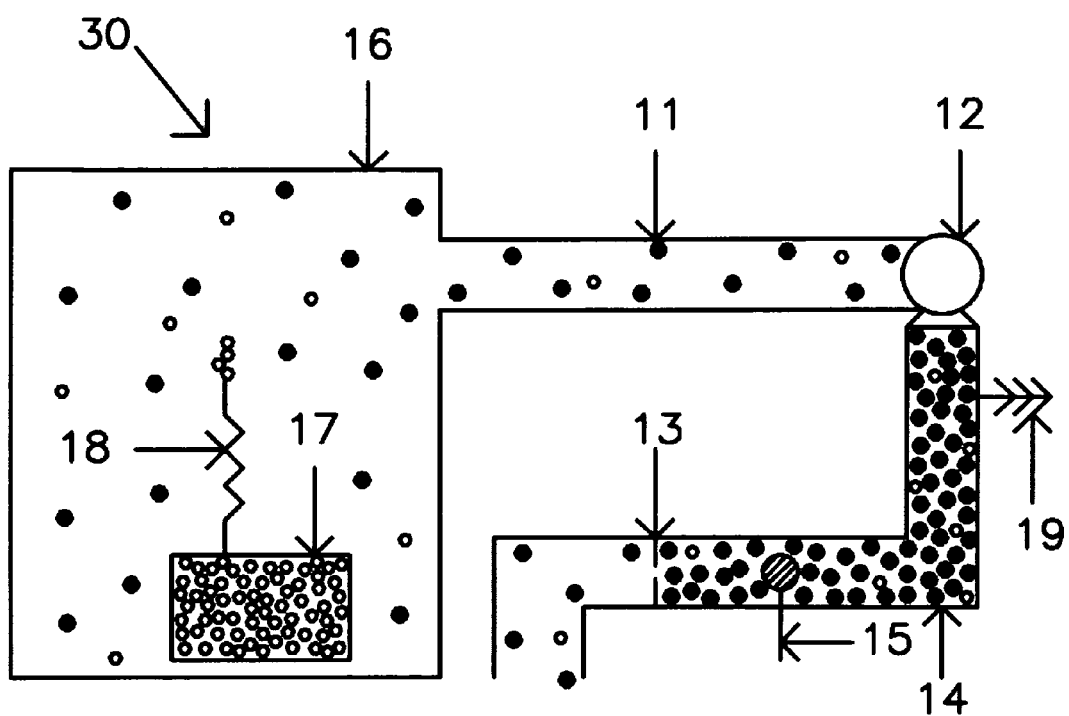
FIG. 3 is a schematic diagram of an example of the present invention configured in a pass-through mode to measure gas leaking out of a component.

Illustrated generally at 30 in FIG. 3 is an example of the invention in which the gas flow downstream from flow restriction 13 is discharged to the surrounding atmosphere instead of being recirculated to chamber 16, and the component is being leak tested in the "inside out" mode. This configuration may be advantageous in some applications, particularly in cases where it is desirable to keep the overall pressure in chamber 16 low.

Example

Figure 4:
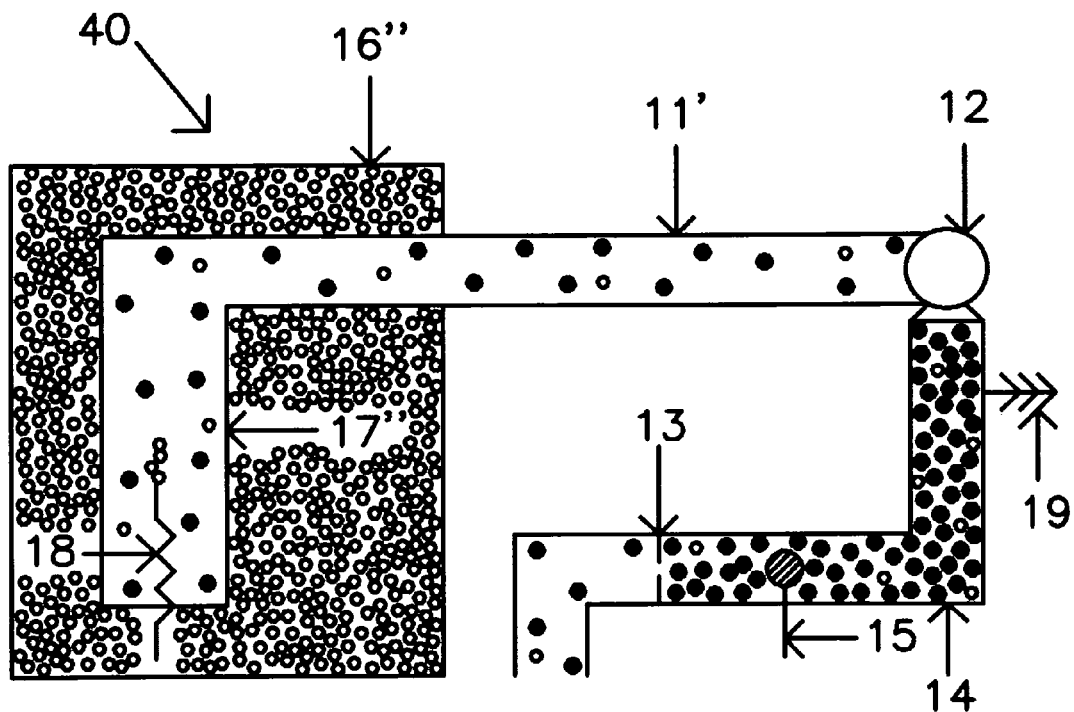
FIG. 4 is a schematic diagram of an example of the present invention configured in a pass-through mode to measure gas leaking into a component.

Illustrated generally at 40 in FIG. 4 is an example of the invention in which the gas flow downstream from flow restriction 13 is discharged to the surrounding atmosphere instead of being recirculated to chamber 16", in similar manner to that shown in FIG. 3, but configured to test component 17" in the "outside in" mode.

Example

Figure 5:
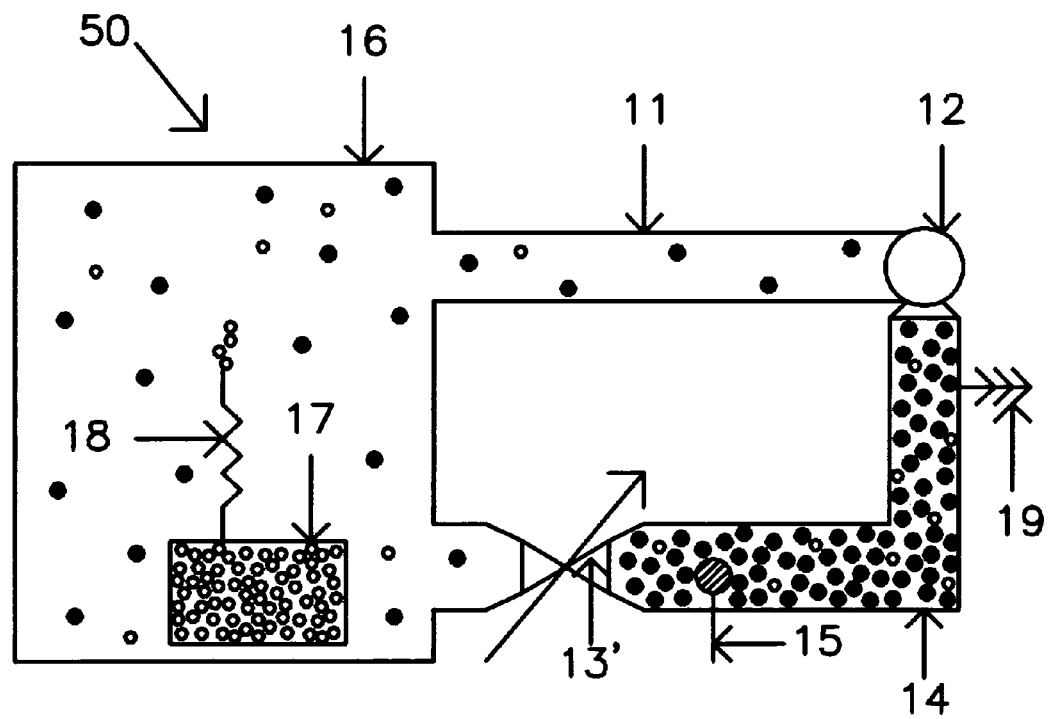
FIG. 5 is a schematic diagram of another example of the present invention configured in a recirculating mode with variable flow restriction to measure gas leaking out of a component.

Illustrated generally at 50 in FIG. 5 is an example of the invention in which the system is configured generally as shown in FIG. 1, but with a variable flow restriction 13' instead of a fixed orifice. The variable flow restriction 13' may be a needle valve or other type of mechanical valve, such as a pneumatically controlled valve, and it may be manually operated to adjust the back pressure to a desired level before starting measurements, or it may be adjusted during testing or to compensate for variations from one component to the next. It may further be part of an electromechanical control system that automatically adjusts the valve, either according to a preset process recipe or in real time to maintain a particular back pressure. Alternatively, the variable flow restriction may comprise a relief valve adjusted to maintain some selected pressure at or above atmospheric.

Example

Figure 6:
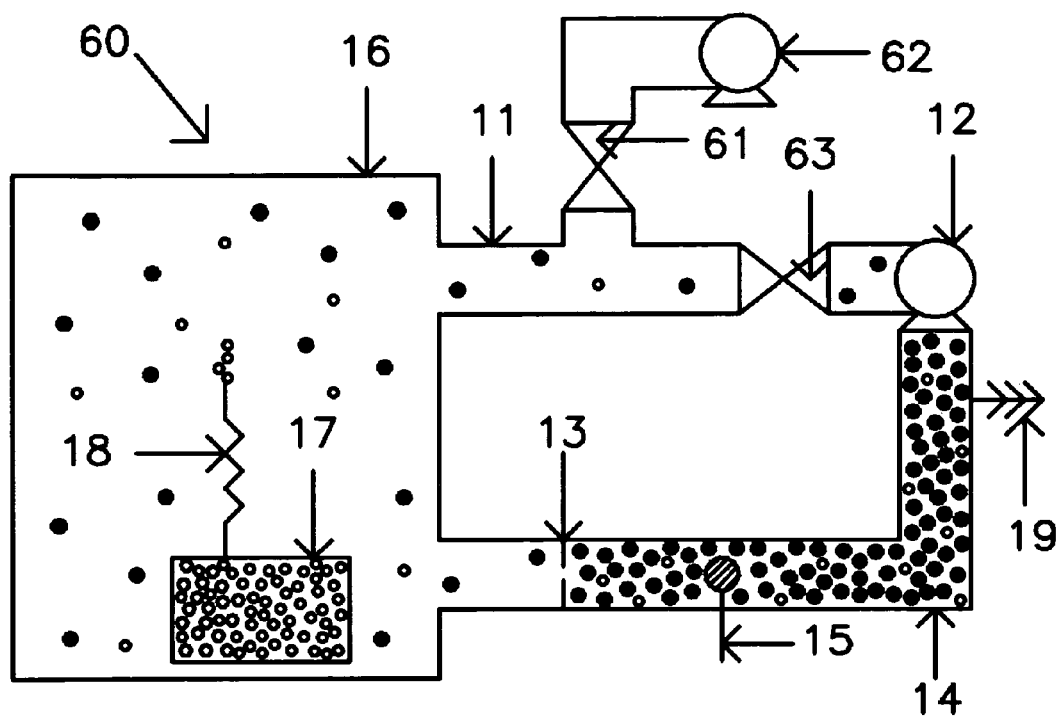
FIG. 6 is a schematic diagram of another example of the present invention, in which an optional roughing pump and valve have been added to reduce the pressure in the test chamber before beginning gas recirculation.

Illustrated generally at 60 in FIG. 6 is another example of the invention, in which a roughing pump 62 is provided to speed the evacuation of the chamber 16 via valve 61. When the pressure in chamber 16 has reached the desired level for testing, valve 61 is closed and valve 63 is opened to begin testing.

Example

A system was constructed with a layout generally as shown in FIG. 6. The demonstration machine using the inventive technique to leak test batteries prefilled with 2 psia helium to a leak rate of $1 \times 10^{-4}$ atm-cm$^3$/s helium.

The battery or calibrated leak to be tested was placed in the chamber and the lid closed. The chamber was 18" in diameter and 24" high, approximately 3.5 cubic feet in volume. The chamber was evacuated by a 90 CFM direct drive mechanical pump [Model 2100AC, Alcatel, Hingham, Mass.] to 16.5 Torr as measured by a 1000 Torr capacitance manometer pressure gauge [Model 626A13TBE, MKS, Andover, Mass.]. The evacuation time was 25 seconds.

The rough valve was isolated and the test valve was opened to an 18 CFM scroll vacuum pump [ULVAC DISL-500, Chigasaki, Japan] for sampling gas from the chamber.

The discharge of the scroll pump operated at 700 Torr and helium was sampled using an helium detector [Inficon T-Guard, Syracuse, N.Y.]. Gas from the discharge of the scroll pump was recirculated back into the chamber using a 0.028" orifice in order to maintain about 10 Torr in the chamber and 700 Torr on the pump discharge for an amplification of 70:1.

Helium was accumulated for 30 seconds to get a sufficient signal to detect a $1 \times 10^{-4}$ atm-cm$^3$/s calibrated leak (FSLT-4-HE-500DOT-WFV Vacuum Technology Inc, Oak Ridge, Tenn.). Using a spread sheet provided by the manufacturer of the T-Guard detector, normal accumulation in the chamber volume at atmospheric pressure would have taken 1000 seconds to achieve an acceptable signal.

At the end of the cycle, the scroll pump was isolated from the chamber, the chamber was vented and the battery removed.

It will be appreciated that by the proper sizing of the pump and flow restriction, the pressure concentration in line 14 compared to the chamber 16 may be any selected value. In many cases this will preferably represent a factor of 2:1 or more preferably 10:1 or even 100:1. The skilled artisan can easily determine an optimal configuration through routine experimentation.

The invention can be used with any desired tracer gas or gas samples, and it will be understood that the tracer gas molecules may be the same size as air, larger than air (e.g., refrigerant gases, sulfur hexafluoride, hydrocarbons, halocarbon gases, etc. and any mixtures thereof) or smaller than air (e.g., hydrogen, helium, oxygen, argon, hydrocarbons, carbon dioxide, etc., and any mixtures thereof). It will be further understood that the sensor may be physically placed within the downstream volume as shown in the drawings, or it may be connected to this volume by a tube through which a gas sample may be extracted for analysis as is well known in the art of gas analysis.

Various detectors are available to test for gases of interest. Some detectors suitable for use in the invention include the following: solid-state sensors for hydrogen; mass spectrometry for helium and all other gases including refrigerants; electron capture sensors for sulfur hexafluoride; permeation sensors for helium; heated diode sensors for refrigerants; infrared absorption sensors for refrigerants, hydrocarbons, carbon dioxide, etc.

Although some of the foregoing examples refer to heat exchangers and more particularly to refrigeration systems, Applicants do not intent to restrict the invention to these particular exemplary uses, but rather it is contemplated that the invention can be used to test all manner of components that have any nominally gas-tight volume into which (or through which) gas may leak. Examples include: pumps, compressors, batteries, fuel tanks, air bag inflators, torque converters, shipping containers, valves, throttle bodies, brazed and/or welded assemblies, plastic drums, metal drums, wheels, etc.

Although the immediate application of the invention has been directed to the detection of gaseous species that have leaked into or out of a volume under test, Applicants contemplate that the underlying principle may also be applied to the more general problem of detecting trace gases or performing gas analysis, particularly in systems operating at pressures lower than atmospheric. In this case, the combination of a vacuum pump, a restriction in the outlet line, and a sensor located between the pump and the flow restriction can serve to concentrate the atmosphere or other sample pressure, and thereby concentrate the tracer gas, to a higher level, thereby making detection or analysis easier, as described in the following example.

Example

Consider a process being conducted at a total pressure of 100 mT, and generating a possible reaction product at a concentration of 0.5%. This reaction product would therefore represent a partial pressure of 0.5 mT. By sizing the pump and the flow restriction properly, a pressure accumulation factor of 100× can be achieved, thereby bringing the partial pressure of the trace component to 50 mT for easier detectability.

We claim:

1. An apparatus for detecting gas leaks comprising:
   a component to be tested, said component containing a tracer gas at a first pressure;
   a chamber for containing said component, said chamber maintained at a second pressure less than said first pressure; and,
   a flow path comprising:
   a gas inlet from said chamber to a pump,
   a gas outlet from said pump,
   a flow restriction device sufficient to create a third pressure greater than said second pressure in a selected volume of said flow path downstream from said pump, and,
   a sensor sampling the gas within said selected volume to detect said tracer gas wherein the sensitivity of said sensor is amplified by a factor equal to the ratio of said third pressure to said second pressure.

2. The apparatus of claim 1 wherein said tracer gas is selected from the group consisting of: refrigerant gases; halocarbon gases; hydrogen; air; sulfur hexafluoride; hydrocarbons; helium; oxygen; argon; carbon dioxide; and mixtures thereof.

3. The apparatus of claim 1 wherein said pump is selected from the group consisting of: scroll pumps; rotary vane pumps; rotary piston pumps; screw pumps; diaphragm pumps; rotary lobe pumps; centrifugal pumps; turbomolecular pumps; drag pumps; diffusion pumps; and claw pumps.

4. The apparatus of claim 1 wherein said flow restriction device comprises a fixed restriction selected from the group consisting of: orifice plates; capillary tubes; and porous plugs.

5. The apparatus of claim 1 wherein said flow restriction device comprises a variable restriction selected from the group consisting of: mechanical valves; electromechanical valves; relief valves; and pneumatically controlled valves.

6. The apparatus of claim 1 wherein said flow path discharges the flow from said flow restriction device back into said chamber.

7. The apparatus of claim 1 wherein said flow path discharges the flow from said flow restriction device into the ambient air.

8. The apparatus of claim 1 wherein said sensor is selected from the group consisting of: IR absorption sensors; mass spectrometers; solid-state sensors; electron capture sensors; permeation sensors; and heated diode sensors.

9. An apparatus for detecting gas leaks comprising: a component to be tested, said component containing an internal volume; a chamber for containing said component, said chamber containing a selected tracer gas at a first pressure; and, a flow path comprising: a gas inlet from said internal volume of said component to a pump, said pump sufficient to establish a second pressure in said internal volume, said second pressure less than said first pressure, a gas outlet from said pump, a flow restriction sufficient to create a third pressure greater than said second pressure in a selected volume of said flow path downstream from said pump, and, a sensor sampling the gas within said selected volume to detect said tracer gas wherein the sensitivity of said sensor is amplified by a factor equal to the ratio of said third pressure to said second pressure.

10. The apparatus of claim 9 wherein said tracer gas is selected from the group consisting of: refrigerant gases; halocarbon gases; hydrogen; air; sulfur hexafluoride; hydrocarbons; helium; oxygen; argon; carbon dioxide; and mixtures thereof.

11. The apparatus of claim 9 wherein said pump is selected from the group consisting of: scroll pumps; rotary vane pumps; rotary piston pumps; screw pumps; diaphragm pumps; rotary lobe pumps; centrifugal pumps; turbomolecular pumps; drag pumps; diffusion pumps; and claw pumps.

12. The apparatus of claim 9 wherein said flow restriction device comprises a fixed restriction selected from the group consisting of: orifice plates; capillary tubes; and porous plugs.

13. The apparatus of claim 9 wherein said flow restriction device comprises a variable restriction selected from the group consisting of: mechanical valves; electromechanical valves; relief valves; and pneumatically controlled valves.

14. The apparatus of claim 9 wherein said flow path discharges the flow from said flow restriction device back into said chamber.

15. The apparatus of claim 9 wherein said flow path discharges the flow from said flow restriction device into the ambient air.

16. The apparatus of claim 9 wherein said sensor is selected from the group consisting of: IR absorption sensors; mass spectrometers; solid-state sensors; electron capture sensors; permeation sensors; and heated diode sensors.

\* \* \* \* \*